United States Patent [19]

Suzuki et al.

[11] Patent Number: 5,028,493

[45] Date of Patent: Jul. 2, 1991

[54] ALUMINUM ALLOY LOCALLY HAVING A COMPOSITE PORTION

[75] Inventors: Yoshihiro Suzuki, Saitama; Toshio Ogiwara, Gyoda; Masaaki Kudo, Kumagaya, all of Japan

[73] Assignee: Izumi Industries, Ltd., Kawagoe, Japan

[21] Appl. No.: 505,516

[22] Filed: Apr. 6, 1990

[30] Foreign Application Priority Data

Jun. 12, 1989 [JP] Japan .................................. 1-149220

[51] Int. Cl.$^5$ .......................... C22C 21/00; F02F 3/00
[52] U.S. Cl. .................................. 428/614; 148/437; 428/613; 428/651; 428/652; 428/653
[58] Field of Search ....................... 420/528; 148/437; 428/613, 652, 653, 651, 614

[56] References Cited

U.S. PATENT DOCUMENTS

| | | | |
|---|---|---|---|
| 4,587,177 | 5/1986 | Toaz et al. | 428/614 |
| 4,987,867 | 1/1991 | Suzuki et al. | 92/222 |

*Primary Examiner*—R. Dean
*Assistant Examiner*—David W. Schumaker
*Attorney, Agent, or Firm*—Jones, Day, Reavis & Pogue

[57] ABSTRACT

A porous metal supporting a composite portion of an aluminum alloy is formed by means of pressing a pair of surfaces thereof, and then chromium is cemented by diffusion before the molten aluminum alloy is penetrated thereinto. Thus, not only the mechanical strength of the interface between the aluminum alloy and the porous metal, but also the wear resistance of the composite portion can be improved.

5 Claims, 4 Drawing Sheets

ALUMINUM ALLOY LOCALLY HAVING A COMPOSITE PORTION

BACKGROUND OF THE INVENTION

1. Field of the Invention

This invention relates to an aluminum alloy locally having a composite portion, and is best applicable to a piston for internal combustion engines, made of aluminum alloy.

2. Description of the Related Art

To improve the mechanical strength of an aluminum alloy, having a composite portion, wherein the aluminum alloy is penetrated into a porous metal under a high pressure, is disclosed, for example, in Japanese Patent Publication No. 60-25619 and Japanese Laid Open Patent No. 62-131771.

Moreover, to improve the wear resistance of an aluminum alloy, a layer, which is a chemical compound of the aluminum alloy and a porous metal made of iron, nickel, copper or the like, is disclosed in Japanese Laid Patent 59-21393, Japanese Laid Open Patent No. 59-218341 and Japanese Laid Open Patent No. 59-212159.

Meanwhile, conventional production methods for the porous metal are classified roughly into three groups as shown in Table 1. Among various factors which influence the tensile strength and the wear resistance of an aluminum alloy having a composite portion, the porosity of a porous metal forming the composite portion increases the tensile strength of the interface, but decreases the wear resistance of the composite portion, as the porosity increases.

Thus, if a porous metal produced by a method of Group 1, is used, the porosity of which is comparatively small, and chromium is not added to the porous metal, a poor composite portion is often obtained due to small changes in the factors during a compounded process, and it becomes difficult to make use of the advantage that the wear resistance increases as the porosity decreases.

On the other hand, if porous metals produced by methods of Groups 2 and 3, are used the porosities of which are comparatively large, the poor composite portion is not formed, but it becomes difficult to improve a wear resistance of the aluminum alloy.

Incidentally, the applicants of this invention have found out that if chromium is cemented into the porous metal by diffusion, the wear resistance of the composite portion of the aluminum alloy is much improved, and on the basis of such fact, the prior application was filed. However, as the porosity of the porous metal becomes less than 40%, the tensile strength of the composite portion is hardly improved, and it probably depends upon the following reason.

As the porosity becomes less than 40%, the diameter of pores in the porous metal becomes small, and penetration distances to the center of the porous metal, where the molten aluminum alloy is to reach, become large, so that it is difficult for the melt to reach the center of the porous metal during the compounded process. Thus, it is necessary to raise the temperature of the melt or the preheating temperature of the porous metal, and as a result, the reaction of the aluminum alloy with the porous metal becomes active on the outer periphery of the porous metal by which a large amount of melt flows.

OBJECTS AND SUMMARY OF THE INVENTION

Accordingly, it is an object of the present invention to provide an aluminum alloy locally having a composite portion, in which a porous metal having a large porosity is used to obtain a high interfacial strength between the aluminum alloy and the porous metal, without adversely affecting the ability of the porous metal to make a good composite portion with the aluminum alloy.

A further object of the invention is to provide an aluminum alloy locally having a composite portion, in which a reaction induced in the interface between a porous metal and an aluminum alloy is prevented and, as a result, the strength of the interface is not decreased.

In accordance with an aspect of this invention, in an aluminum alloy locally having a composite portion, a pair of surfaces of a porous metal, with a porosity in the range of 85 to 90%, are pressed so as to be plastically compressed in a predetermined direction thereof, chromium is cemented into the porous metal by diffusion so far that the chromium content reaches a range of 20 to 55% at the center of the porous metal, and a composite portion is formed in the aluminum alloy by means of penetrating the molten aluminum alloy into the cemented porous metal to locally strengthen the aluminum alloy.

In a preferred embodiment of this invention, a plane which is included in the composite portion of the aluminum alloy and perpendicular to the pair of surfaces of the porous metal, may serve as a sliding surface which comes into sliding contact with another member, so as to improve the wear resistance of the aluminum alloy.

The porous metal can be pressed so that pores may be deformed to a degree of more than 20% in the direction that the porous metal being pressed, and further, the porous metal can be made of iron or nickel.

Moreover, the aluminum alloy having the composite portion may serve as a piston for internal combustion engines. At that time, at least a piston groove is formed in the composite portion, and a pair of upper and lower surfaces of the piston groove extend in a direction perpendicular to the pair of pressed surfaces and that in the radius direction of the piston.

In the present invention, a porous metal having a porosity of 85 to 98% is used, and therefore, the volumetric ratio thereof falls within a range of 2 to 15%, so that the wear resistance increases not so much. Thus, in the present invention, a pair of surfaces of the porous metal are pressed so that the porous metal may be plastically deformed under compression, and thereby, the wear resistance is improved because the volumetric ratio of the porous metal serving as a reinforcement increases.

Moreover, as the porous metal is pressed only in one direction, the dimension of pores viewed in parallel with the pressed direction does not change, so that a good composite portion is obtained because the molten aluminum alloy penetrates into the porous metal in the same degree as before, but in a surface perpendicular to the pair of pressed surface, the apparent volumetric ratio increases more than the real volumetric ratio, so that the wear resistance increases very much.

In addition, chromium is cemented into the porous metal may undergo diffusion so that the chromium content is in the range of 20 to 55%. Moreover, the molten aluminum alloy easily penetrates into the porous metal, so that a reaction is not caused in the interface between the aluminum alloy and the outer periphery of the porous metal which is obtained by the method of Group 1 described in Table 1, thereby improving the tensile strength of the interface.

The above, and other objects, features and advantages of this invention will be apparent from the following detailed description of an illustrative embodiment thereof to be read in connection with the accompanying drawings, wherein like reference numerals or letters identify the same or corresponding parts in the several views.

DETAILED DESCRIPTION OF A PREFERRED EMBODIMENT

Referring to the accompanying drawings, an embodiment of the invention, in which the invention is applied to a piston for internal combustion engines made of aluminum alloy, will be hereinafter described.

Firstly, three plates of porous metal made of nickel (manufactured by "Sumitomo-Denko" Co, Ltd. and identified by "Celmet") are rolled between rolls to obtain three kinds of rolled plates which are 4, 3 and 2 mm in thickness, and 20, 40, and 60% in volumetric ratio, respectively. The porous metal, itself, has a volumetric ratio of 6.3% and a thickness of 5 mm. Further, the pore of the porous metal has a diameter of 0.4 mm.

Then, these rolled plates are chromized. That is, they are embedded in a mixed powder of chromium and alumina, tightly enclosed, and heated for eight hours at a temperature of 1080° C. in a hydrogen gas stream to cement 30 to 45% chromium into the rolled plates by diffusion. The rolled plates may be chromized two times under the same condition to cement 55% chromium, heated for four hours to cement 70 to 40% chromium.

After heating at a temperature of 400° C., the rolled plates are set in a metal mold, and a molten aluminum alloy (JIS:AC8A) is poured into the metal mold. After the metal mold is closed up tightly, the melt is pressed under the pressure of 800 kgf/cm$^2$. Thus, various test pieces of composite material based upon the aluminum alloy AC8A are obtained.

Figure 1:
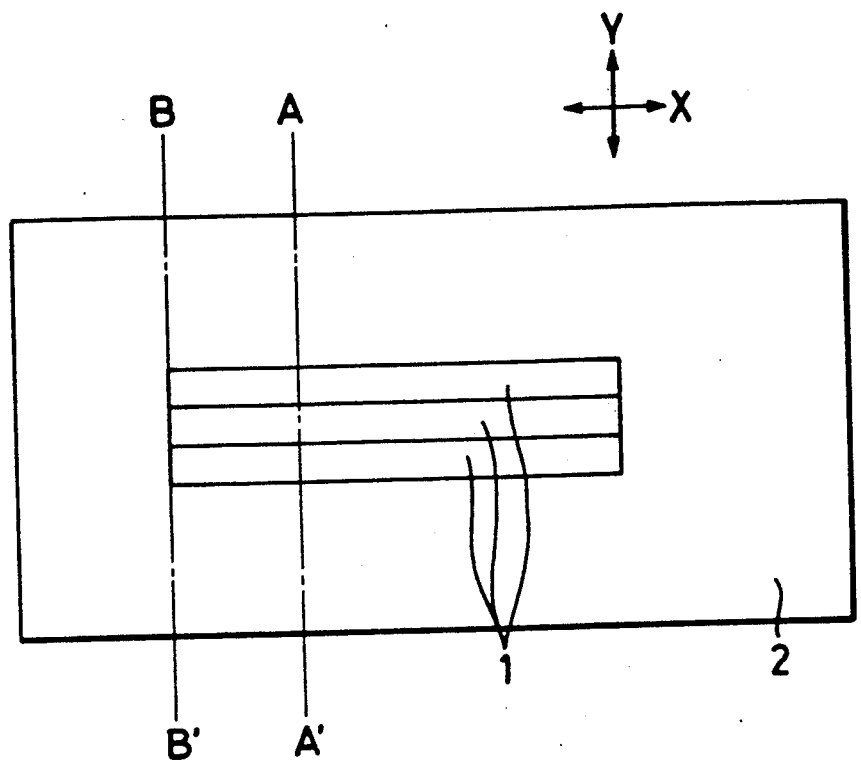
FIG. 1 is a front view of a test piece to which this invention is applied.

The test piece shown in FIG. 1 is one such that the composite material described above then receives a solid solution treatment for five hours at a temperature of 500° C., and subsequently, an aging treatment for four hours at a temperature of 200° C. (the so-called T6 treatment prescribed by JIS). In FIG. 1, arrows X and Y denote directions for the test piece being loaded under a tension test (hereinafter described), and for the porous metal being pressed, respectively.

Figure 2:
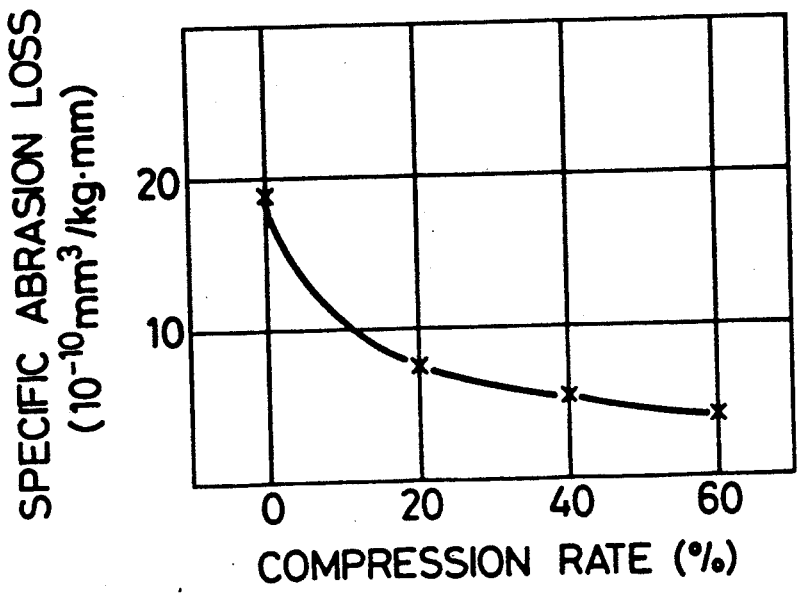
FIG. 2 is a graphical representation of a compression rate—specific abrasion loss relationship of a composite material, examined by the test piece of FIG. 1 (when the chromium content is within a range of 40 to 45%)

Test pieces which contain chromium in a range of 40 to 45% are tested by Ogoshi's abrasion tester to examine the wear resistance of section A—A' in FIG. 1, and a test result is graphically represented in FIG. 2.

According to the test results shown in FIG. 2, even when the compression rate is 20%, the value of specific abrasion loss is lower than that obtained at the time when the compression rate is 0%. Furthermore, the section A—A' shown in FIG. 1 was examined by dye check, and it became apparent that no defect was found in the composite portion of the aluminum alloy.

Tensile strengths of test pieces, the porous metal containing no chromium, and other test pieces having three kinds of compression rates with porous metal containing 40% chromium, are examined. Such test pieces are so designed as to rupture in section B—B' of FIG. 1.

Figure 3:
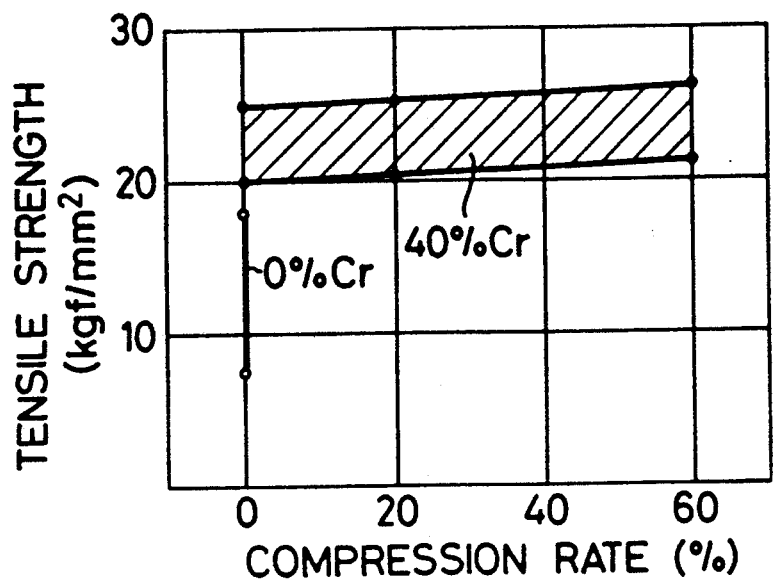
FIG. 3 is a graphical representation of a compression rate—tension strength relationship of the composite material, examined by the test piece of FIG. 1 (wherein the chromium content is used as a parameter)

According to the test result shown in FIG. 3, it is apparent that the tensile strength obtained when the test piece contains the chromium is higher than that of the test piece which contains no chromium, and it seems that the above result derives from the fact that the chromium prevents a reaction induced in the interface between the aluminum alloy AC8A and the porous metal "Celmet".

According to a result of similar tests which are made for test pieces comprising a porous metal obtained by means of sintering a powder of grain number 200, is made of stainless steel (JIS:SUS316L), and has a specific weight of 45% and a porosity of 53%, the maximum value and the mean value of the tensile strength are 18 kgf/mm$^2$ and 12 kgf/mm$^2$, respectively. Therefore, it is apparent that the tensile strength obtained by the test pieces which contain 40% chromium is higher than that obtained by such test pieces.

Figure 4A:
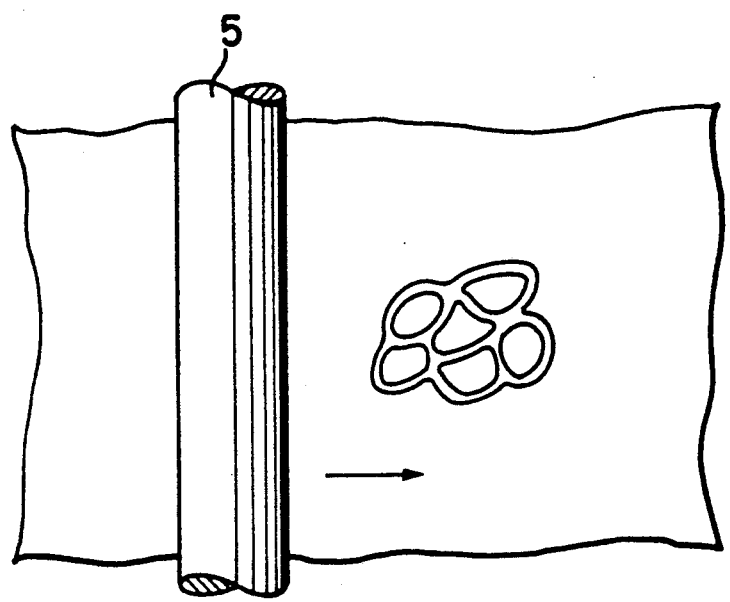
FIG. 4A and 4B are explanatory drawings of pores of a porous metal.

If a pair of surfaces of a porous metal which has a porosity of 85 to 98% are pressed as specified in claim 1, the configuration of pores in the porous metal, which is initially as illustrated in FIG. 4A, hardly changes in a surface parallel to the pair of pressed surfaces, so that the molten aluminum alloy penetrates very smoothly into the porous metal due to high porosity of the porous metal. However, in surfaces parallel to the rolled direction (denoted by an arrow in FIG. 4A) and perpendicular to the pair of surfaces, the pores are elongated in the rolled direction but shortened in a compressed direction thereof as shown in FIG. 4B, so that the wear resistance of the porous metal is improved due to an effect similar to an increase of the volumetric ratio of the porous metal.

Figure 4B:
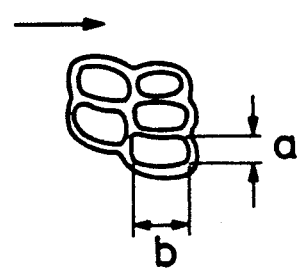

If the lengths of the pore measured in the compressed direction and in the rolled direction are defined as a and b as shown in FIG. 4B, respectively, the wear resistance is much improved in a surface in which (b/a) is more than 1.2. Though a surface perpendicular to the pair of surfaces and extending in a direction perpendicular to the rolled direction is not illustrated in the drawings, the same may be said of such surface.

As the porosity of the porous metal should be in a range of 85 to 98%, the porous metals obtained by the production methods of Group 1 and 2 are available, and it is preferable that the porous metal is made of iron or nickel. If it is made of other metals, it becomes difficult to prevent the reaction induced in the interface due to existence of the chromium, and further, to improve the wear resistance of the composite portion of the aluminum alloy.

To prevent the reaction induced in the interface, it is preferable that the chromium content exceeds 10% and is more than 15%. The wear resistance becomes large as the chromium content increases, but if the chromium content increases over 55%, the wear resistance is not improved so much. Further, the chromium should be cemented before the porous metal is rolled, lest the plastic working should be made difficult due to existence of the chromium.

Figure 5:
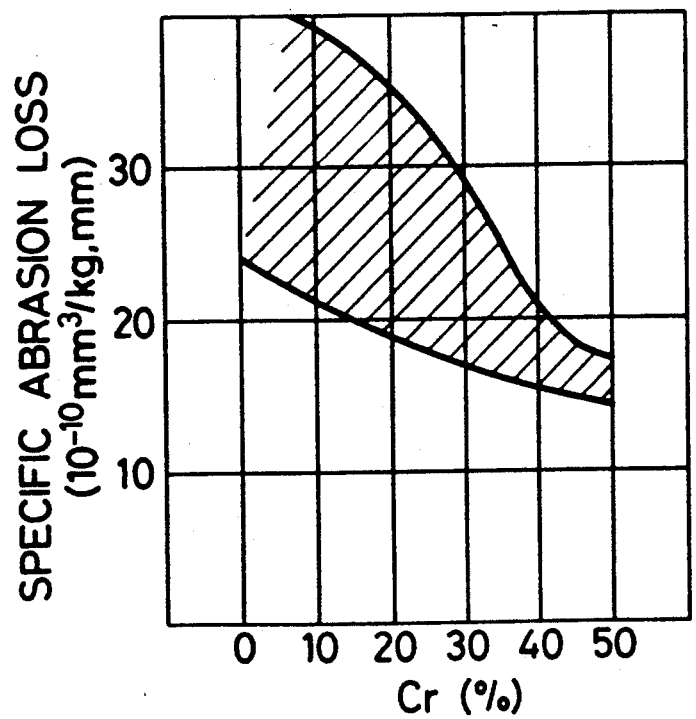
FIG. 5 is a graphical representation of a chromium content—specific abrasion loss relationship of the composite material, examined by the test piece of FIG. 1.

The wear resistance of a porous metal which has a volumetric ratio of 6.3% is examined by an Ogoshi abrasion testing machine. According to the test result shown in FIG. 5, the specific abrasion loss decreases as the chromium content increases. In reference to the test result, the distribution of the chromium was examined by a X-ray microanalyzer on a test piece which contains chromium at less than 30%, and it became apparent that the scatter of chromium content from the outer periphery to the center of the porous metal was normally correlative with that of the specific abrasion loss. If the chromium percentage at the center of the porous metal and the mean value of the chromium content are adjusted to be more than 20% and 30%, respectively, the scatter of the specific abrasion loss may be decreased.

Referring through FIGS. 6A to 6D, an embodiment in which the present invention is applied to a piston for internal combustion engines, made of aluminum alloy, will be hereinafter described.

Figure 6A:
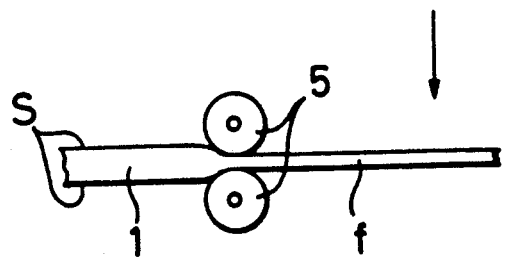
FIGS. 6A through 6D are explanatory drawings of a piston groove of an improved piston according to an embodiment of this invention.
Figure 6B:
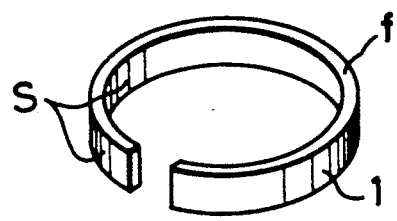

As shown in FIG. 6A, a pair of surfaces s of a narrow plate 1 made of porous metal "Celmet" are pressed by rolls 5, and the plate 1 is formed into a ring as shown in FIG. 6B, in which a pair of surfaces f perpendicular to the pair of surfaces s become the top and bottom ones of the annular plate 1, respectively.

Figure 6C:
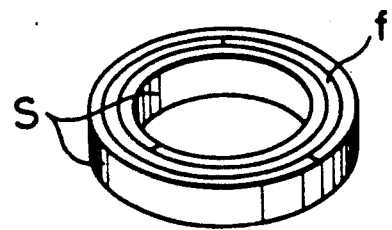

Next, three of the annular plates 1 are superposed as shown in FIG. 6C, and chromized. Thereafter, the annular plates 1 are set in a predetermined position within a metal mold, and a molten aluminum alloy is poured into the metal mold. After the metal mold is closed tightly, the melt is pressed under a predetermined high pressure to obtain a blank for the piston.

Figure 6D:
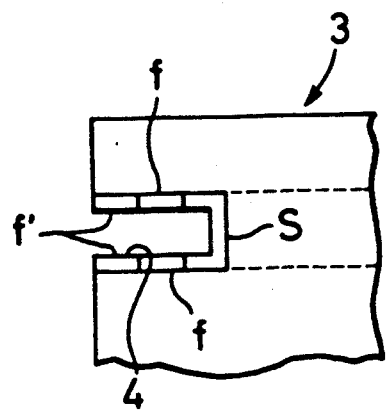

As shown in FIG. 6D, when a piston ring groove 4 is machined within the annular plates 1, the upper and lower surfaces f' of the piston ring groove 4, which are to be brought into sliding contact with a piston ring (not shown), correspond to a pair of surfaces perpendicular to the pair of surfaces s, so that the wear resistance of the piston ring groove 4 is much improved.

If the present invention is applied to a disk of a disk brake, made of aluminum alloy, the surface f of annular plates shown in FIG. 6C should be designed to expose in a surface of the disk, which is to be rubbed with the other disk of the disk brake.

According to this invention, the wear resistance of the composite portion of the aluminum alloy can be improved without increasing so much the volumetric ratio of the porous metal, and incurring production cost rises due to increase of the volumetric ratio.

Moreover, even when a porous metal having a low volumetric ratio is used, to improve the wear resistance thereof can be accomplished if an anisotropy is given to the porous metal, so that the mechanical strength of the composite portion of the aluminum alloy can also be improved together with the wear resistance.

TABLE 1

| | Production Method of the Porous Metal | |
|---|---|---|
| Group | Method | Porosity (%) |
| 1 | Metallic powder is loosely filled, and then sintered. | ≈20 to 58 |
| 2 | Metallic fiber is filled, and then sintered. | ≈75 to 88 |
| 3 | A three dimensional network of synthetic resin is plated with metal, and then the synthetic resin is removed. | ≈85 to 98 |

What is claimed is:

1. An aluminum alloy locally having a composite portion wherein:
a pair of surfaces of a porous metal, the porosity of which is in a range of 85 to 98%, is pressed so as to be plastically compressed in a predetermined direction thereof; chromium is cemented into the porous metal by diffusion so far that the chromium content reaches a range of 20 to 55% at the center of the porous metal; and a composite portion is formed in the aluminum alloy by means of penetrating the molten aluminum alloy into the cemented porous metal to locally strengthen the aluminum alloy.

2. An aluminum alloy according to claim 1, wherein a plane, which is included in the composite portion of the aluminum alloy and perpendicular to the pair of surfaces of the porous metal, serves as a sliding surface which comes into contact with that of another member.

3. An aluminum alloy according to claim 1, wherein the pore of the porous metal is deformed to a degree of more than 20%.

4. An aluminum alloy according to claim 1, in which the porous metal is made of iron or nickel.

5. An aluminum alloy according to claim 2, for use in a piston for internal combustion engines, wherein the composite portion serves for strengthening at least a top piston-ring groove of the piston, the composite portion having two surfaces which are included in the porous metal, and extend in a direction perpendicular to the pair of pressed surfaces and in the radius direction of the piston in order to serve as a pair of upper and lower surfaces of the piston ring groove, which is brought into sliding contact with a piston ring.

* * * * *

UNITED STATES PATENT AND TRADEMARK OFFICE
CERTIFICATE OF CORRECTION

PATENT NO. : 5,028,493
DATED : July 2, 1991
INVENTOR(S) : Yoshihiro Suzuki, et. al.

It is certified that error appears in the above-indentified patent and that said Letters Patent is hereby corrected as shown below:

```
Title page, item [75]
Col. 1,   In the Inventors Section, line 1, change "Saitama"
     to --Kitaadachi--.
Column 1, line 44, change "3, are used" to --3 are used,--.
Column 1, line 45, change "th" to --a--.
Column 1, line 55, change "portion" to --interface--.
Column 2, line 29, change "plane" to --plane,--.
Column 2, line 37, change "metal being pressed, and further,"
     to --metal is being pressed. Furthermore,--.
Column 2, line 66, change "may undergo" to --by--.
Column 3, line 56, change "mium, heated" to --mium, or heated--.
Column 3, line 56, change "70" to --10--.
Column 4, line 8, change "A' in" to --A' shown in--.
Column 4, line 57, change "a" to --A--.
Column 4, line 58, change "b" to --B--.
Column 5, line 11, change "before" to --after--.
Column 5, line 31, change "to" to --through--.
Column 5, line 33, change "s" to --S--.

Column 5, line 39, change "s" to --S--.
Column 5, line 54, change "s" to --S--.
```

Signed and Sealed this

Ninth Day of November, 1993

Attest:

BRUCE LEHMAN

*Attesting Officer*   *Commissioner of Patents and Trademarks*